United States Patent
Jao et al.

(10) Patent No.: US 9,398,657 B2
(45) Date of Patent: Jul. 19, 2016

(54) LIGHT EMITTING DEVICE DRIVER CHIP

(71) Applicants: Tong-Cheng Jao, Taichung (TW); Isaac Y. Chen, Zhubei (TW); Yi-Wei Lee, Taipei (TW)

(72) Inventors: Tong-Cheng Jao, Taichung (TW); Isaac Y. Chen, Zhubei (TW); Yi-Wei Lee, Taipei (TW)

(73) Assignee: RICHTEK TECHNOLOGY CORPORATION, Chupei, Hsinchu (TW)

( * ) Notice: Subject to any disclaimer, the term of this patent is extended or adjusted under 35 U.S.C. 154(b) by 0 days.

(21) Appl. No.: 14/595,743

(22) Filed: Jan. 13, 2015

(65) Prior Publication Data

US 2016/0100463 A1  Apr. 7, 2016

(30) Foreign Application Priority Data

Oct. 7, 2014  (TW) .............. 103217811 U (51) Int. Cl.
| | | |
|---|---|---|
| H05B 37/00 | (2006.01) | |
| H05B 39/00 | (2006.01) | |
| H05B 41/00 | (2006.01) | |
| H05B 33/08 | (2006.01) | |

(52) U.S. Cl.
CPC .......... H05B 33/083 (2013.01); H05B 33/0812 (2013.01)

(58) Field of Classification Search
None
See application file for complete search history.

(56) References Cited

U.S. PATENT DOCUMENTS

| | | | |
|---|---|---|---|
| 6,989,807 B2 | 1/2006 | Chiang | |
| 7,081,722 B1 | 7/2006 | Huynh et al. | |
| 8,410,717 B2 * | 4/2013 | Shteynberg et al. | ......... 315/291 |
| 9,125,261 B2 * | 9/2015 | Reed | |
| 2011/0227485 A1 * | 9/2011 | Huynh | ......... 315/127 |
| 2011/0273102 A1 | 11/2011 | van de Ven et al. | |

* cited by examiner

*Primary Examiner* — Anh Tran
(74) *Attorney, Agent, or Firm* — Tung & Associates (57) ABSTRACT

The present invention discloses a light emitting device driver chip for driving light emitting devices in series. The chip includes: plural pins electrically connected to corresponding light emitting devices, respectively, wherein an internal voltage is provided through a predetermined one of the pins; a voltage regulation circuit for providing an operation voltage according to the internal voltage; a switch circuit including plural switch groups electrically connected to corresponding pins, respectively; a current source circuit for providing a current to the light emitting devices; and a switch control circuit for controlling the switch groups to determine which light emitting device is turned ON. The light emitting device driver chip does not directly receive the rectified input voltage.

7 Claims, 5 Drawing Sheets

LIGHT EMITTING DEVICE DRIVER CHIP

CROSS REFERENCE

The present invention claims priority to TW 103217811, filed on Oct. 7, 2014.

BACKGROUND OF THE INVENTION

1. Field of Invention

The present invention relates to a light emitting device driver chip; particularly, it relates to such light emitting device driver chip which is not directly connected to a rectified input voltage.

2. Description of Related Art

Figure 1A:
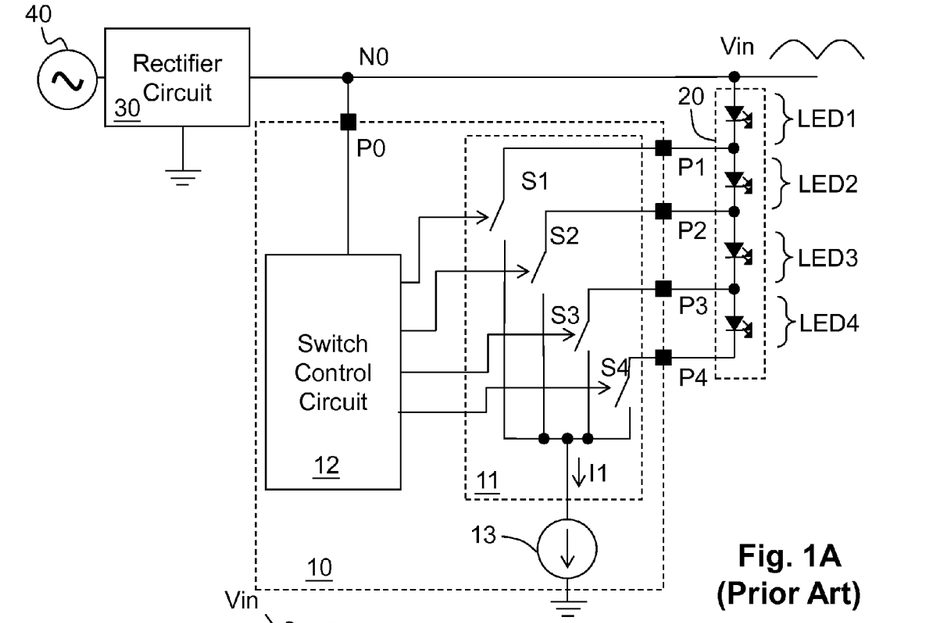
FIG. 1A shows a schematic view of a conventional light emitting diode (LED) driver chip 10 and the related circuits thereof.
Figure 1B:
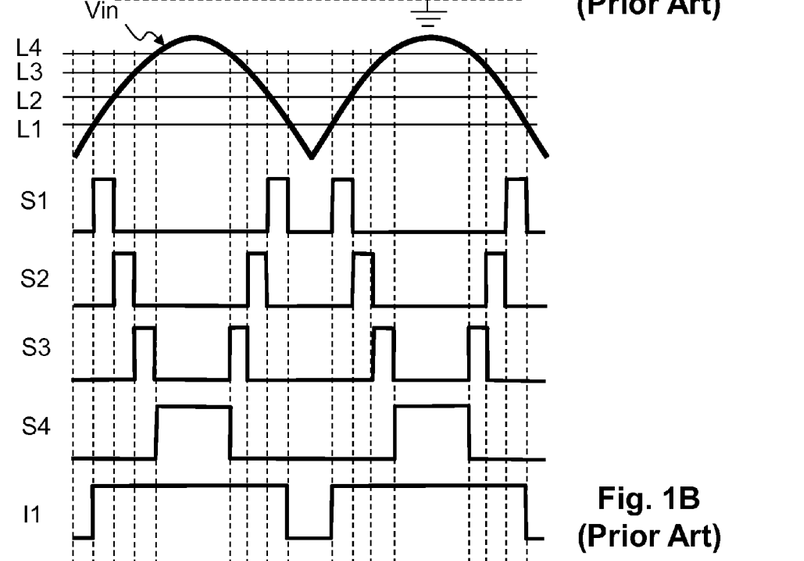
FIG. 1B shows the wave forms of the conventional LED driver chip 10 and its related circuits.

FIG. 1A shows a schematic view of a conventional light emitting diode (LED) driver chip 10 and the related circuits thereof. As shown in FIG. 1A, the LED driver chip 10 comprises pins P0-P4, a switch circuit 11, a switch control circuit 12 and a constant current source 13. The LED driver chip 10 drives an LED circuit 20. The LED circuit 20 comprises plural LEDs connected in series, e.g., LED1, LED2, LED3 and LED4 as shown in FIG. 1A. The switch circuit 11 includes four corresponding switches S1, S2, S3 and S4, which are electrically connected to the corresponding LEDs LED1, LED2, LED3 and LED4. An alternating current (AC) power source 40 generates an AC voltage. A rectifier circuit 30 rectifies the AC voltage to generate a rectified input voltage Vin as shown in FIG. 1B. The LED driver chip 10 drives the LED circuit 20 according to the level of the rectified input voltage Vin, to turn ON or OFF selected one(s) of the switches S1-S4, so that one or more of the LEDs LED1-LED4 of the LED circuit 20 emit light.

For example, as shown by the wave forms in FIG. 1B, when the level of the rectified input voltage Vin is lower than a level L1, none of the switches S1-S4 are turned ON, and none of the LEDs LED1-LED4 emits light. When the level of the rectified input voltage Vin is between the level L1 and a level L2, the switch S1 is turned ON whereas the switches S2-S4 are OFF, so that only LED LED1 emits light. When the level of the rectified input voltage Vin is between the level L2 and a level L3, the switch S2 is turned ON whereas the switches S1 and S3-S4 are OFF, so that LEDs LED1 and LED2 emit light. When the level of the rectified input voltage Vin is between the level L3 and a level L4, the switch S3 is turned ON whereas the switches S1-S2 and S4 are OFF, so that LEDs LED1-LED3 emit light. When the level of the rectified input voltage Vin is greater than the level L4, the switch S4 is turned ON whereas the switches S1-S3 are OFF, so that all LEDs LED1-LED4 emit light. The following patents contain relevant details as to how the LED driver chip 10 drives the LED circuit 20 according to the level of the rectified input voltage Vin: U.S. Pat. No. 6,989,807, U.S. Pat. No. 7,081,722 and U.S. Patent Publication No. 2011/0273102.

The constant current source 13 provides a current having a constant level, so that when one or more of the LEDs LED1-LED4 are emitting light, the current flowing through the one or more of the LEDs LED1-LED4 is a constant. As shown by the wave form of the current I1 in FIG. 1B, when at least one of the LEDs LED1-LED4 is emitting light, the current I1 is a constant regardless how many LEDs are emitting light. The level of the current I1 is equal to zero only when the level of the rectified input voltage Vin is lower than the level L1 (i.e., when none of the LEDs LED1-LED4 can emit light).

As compared to another type of LED driver which drives the LED circuit via a direct current (DC), the advantage of the conventional LED driver chip 10 is in that: it does not need to convert the rectified input voltage Vin to a DC voltage, thus reducing the manufacturing cost. If the frequency of the rectified input voltage Vin is sufficiently high, human eyes will not perceive the flicker of the LED circuit 20. However, one of the drawbacks of the conventional LED driver chip 10 is that: the operation voltage required by the switch control circuit 12 is also supplied from the rectified input voltage Vin generated by the rectifier circuit 30. As a result, for a LED driver chip 10 which is packaged into an integrated circuit (IC) chip, such LED driver chip 10 is required to further include an extra pin P0, in addition to the pins P1-P4 respectively connected to the LEDs LED1-LED4. That is to say, an additional pin P0 is required to connect to a node N0 for receiving the rectified input voltage Vin generated by the rectifier circuit 30, as a power source required for the operation of the LED driver chip 10. Consequently and undesirably, the pin P0 can not be omitted, thus hindering the IC chip from reducing its size and volume.

In view of the above, to overcome the drawback in the prior art, the present invention proposes a light emitting device driver chip which is not directly connected to a rectified input voltage. Therefore, the pin P0 required in the conventional LED driver chip 10 can be omitted, thereby reducing not only the size of the light emitting device driver chip but also the manufacturing cost.

SUMMARY OF THE INVENTION

From one perspective, the present invention provides a light emitting device driver chip for driving a light emitting device circuit, wherein the light emitting device circuit includes a plurality of light emitting devices connected in series and the light emitting device circuit is for receiving a rectified input voltage, the light emitting device driver chip comprising: a plurality of pins, each of which is electrically connected to a corresponding one or ones of the light emitting devices, respectively, wherein an internal voltage is provided through a predetermined one (predetermined pin) of the pins; a voltage regulation circuit electrically connected to the predetermined pin, for receiving the internal voltage so as to provide an operation voltage, wherein the operation voltage is a power source required for an operation of an internal circuit of the light emitting device driver chip; a switch circuit including a plurality of switch groups, wherein each of the switch groups is electrically connected to a corresponding one of the pins, respectively; a current source circuit electrically connected to the switch circuit, for providing a light emitting device current to at least one light emitting device which is turned ON; and a switch control circuit electrically connected to the switch circuit, for generating an operation signal to control at least one of the switch groups of the switch circuit, so as to determined which light emitting device is turned ON; wherein the light emitting device driver chip does not directly receive the rectified input voltage.

In one embodiment, the voltage regulation circuit includes: a high voltage circuit electrically connected to the predetermined pin, for receiving the internal voltage so as to provide a converted voltage; and a voltage regulator electrically connected to the high voltage circuit, for generating the operation voltage according to the converted voltage.

In one embodiment, the high voltage circuit includes: an impedance circuit having a first end and a second end, wherein the first end is electrically connected to the predetermined pin to receive the internal voltage; a high voltage regulation switch electrically connected between the predetermined pin and the voltage regulator, and is controlled by a voltage at the second end to convert the internal voltage into the converted voltage; and a clamp circuit electrically connected between the second end and a ground voltage level, for clamping a voltage level at the second end and for blocking a current from flowing from the impedance circuit to the ground voltage level.

In one embodiment, each of the switch groups includes: a high voltage switch including: a first current inflow terminal electrically connected to the corresponding one of the pins; a first control terminal electrically connected to the voltage regulation circuit, for determining whether the high voltage switch is turned ON or turned OFF according to the internal voltage; and a first current outflow terminal; and a low voltage switch electrically connected to the high voltage switch in series, wherein the low voltage switch includes: a second current inflow terminal electrically connected to the first current outflow terminal; a second control terminal electrically connected to the switch control circuit, for receiving the operation signal; and a second current outflow terminal electrically connected to the current source circuit.

In one embodiment, the voltage regulator includes a low dropout regulator (LDO) circuit.

In one embodiment, the voltage regulator is electrically connected to an exterior capacitor and the exterior capacitor is electrically connected between the voltage regulator and a ground voltage level, for regulating the operation voltage.

In one embodiment, one of the switch groups includes: a high voltage switch electrically connected to the predetermined pin, wherein whether the high voltage switch is turned ON or turned OFF is determined according to the internal voltage; and a low voltage switch electrically connected to the high voltage switch in series, wherein the low voltage switch is electrically connected to the switch control circuit for receiving the operation signal which determines which one or ones of the light emitting devices are turned ON; wherein the high voltage circuit and the switch group includes the same high voltage switch which is electrically connected to the predetermined pin.

The objectives, technical details, features, and effects of the present invention will be better understood with regard to the detailed description of the embodiments below, with reference to the attached drawings.

DESCRIPTION OF THE PREFERRED EMBODIMENTS

The above and other technical details, features and effects of the present invention will be will be better understood with regard to the detailed description of the embodiments below, with reference to the drawings. The drawings as referred to throughout the description of the present invention are for illustration only, to show the interrelations between the apparatus, circuits and devices, but not drawn according to actual scale.

Figure 2:
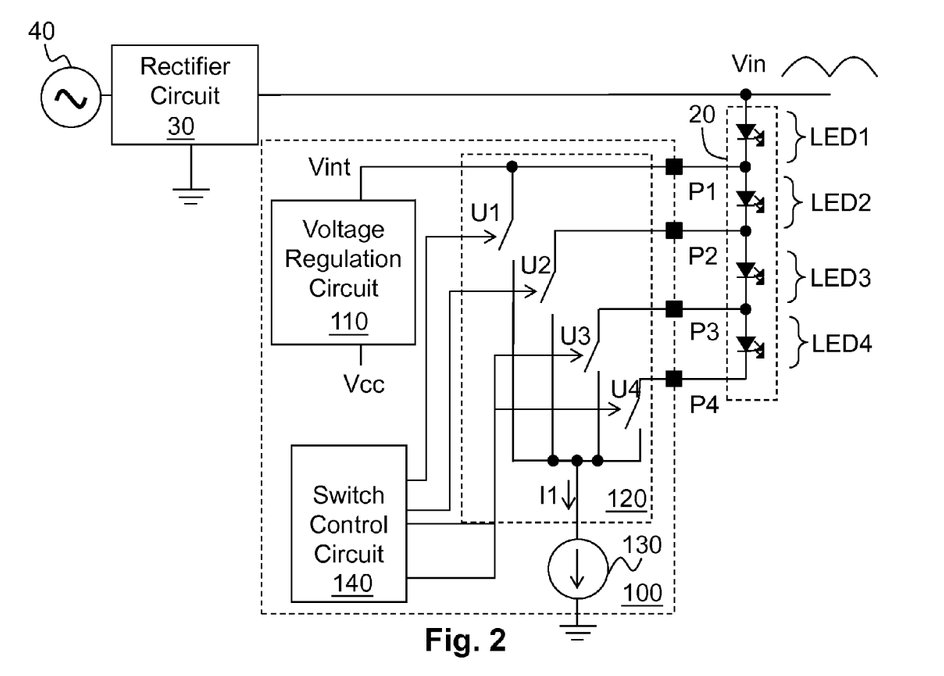
FIG. 2 shows a first embodiment of the present invention.

Please refer to FIG. 2, which shows a first embodiment of the present invention. As shown in FIG. 2, a light emitting device driver chip 100 for driving a light emitting device circuit includes plural pins P1-P4, a voltage regulation circuit 110, a switch circuit 120, a current source circuit 130 and a switch control circuit 140. In this embodiment, the light emitting device circuit can be, for example but not limited to, an LED circuit 20 which includes plural (e.g., four) LEDs LED1, LED2, LED3 and LED4 connected in series. The pins P1-P4 are connected to the corresponding LEDs LED1-LED4, respectively. An internal voltage Vint is provided through a predetermined pin among the pins P1-P4, which is for example the pin P1. A rectifier circuit 30 rectifies, for example but not limited to, an AC voltage generated from an AC power source 40, to generate a rectified input voltage Vin having a waveform as shown in FIG. 2. However, the present invention is not limited to what is shown in the figure; in another embodiment, the input voltage Vin can be an AC voltage. The voltage regulation circuit 110 is electrically connected to the predetermined pin P1 to receive the internal voltage Vint from the predetermined pin P1, and generate an operation voltage Vcc according to the internal voltage Vint. The operation voltage Vcc provides a power source for an operation of an internal circuit in the light emitting device driver chip 100. The switch circuit 120 includes plural switch groups U1-U4, wherein the switch groups U1-U4 are electrically connected to the corresponding pins P1-P4, respectively. The current source circuit 130 is electrically connected to the switch circuit 120, for providing a LED current I1 to one or more LEDs which are turned ON. The switch control circuit 140 is electrically connected to the switch circuit 120; the switch control circuit 140 generates an operation signal OP which controls at least one of the switch groups U1-U4 of the switch circuit 120 to determining which LED is turned ON. Note that in this embodiment, the light emitting device driver chip 100 is not directly connected to the rectified input voltage Vin.

In comparison with the conventional LED driver chip 10 shown in FIG. 1A, this embodiment of the present invention does not include the pin P0 which is connected to the node N0 for receiving the rectified input voltage Vin generated by the rectifier circuit 30. Thus, the light emitting device driver chip 100 of the present invention can reduce one pin. Instead of using the pin P0 to receive power, the present invention can select any one pin (for example but not limited to the pin P1) among the pins P1-P4, as a predetermined pin to receive and provide the power required for the operation of the light emitting device driver chip 100. Thus, the present invention can reduce the size and cost of the light emitting device driver chip 100. Note that the predetermined pin is not limited to the pin P1; it can be the pin P2, P3 or P4 instead. Any pin (e.g., the pin P1, P2, P3 or P4) which is required for electrically connecting the light emitting device circuit to one of the switch groups U1-U4 can be used as the predetermined pin, and the voltage regulation circuit 110 can be electrically connected to this predetermined pin to receive the internal voltage Vint so as to provide the operation voltage Vcc for the operation of the light emitting device driver chip 100. Also note that, "the power required for the operation of the light emitting device driver chip 100" means that the light emitting device driver chip 100 requires power to maintain the normal operation of its internal circuits, and such power is often required to maintain at a predetermined DC voltage level.

Figure 3:
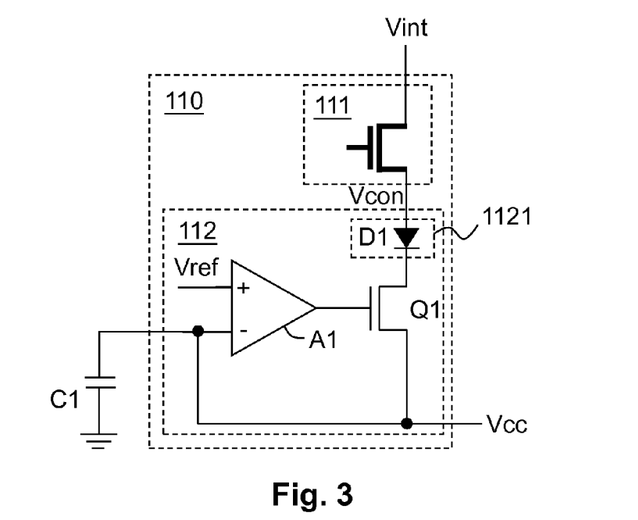
FIG. 3 shows a second embodiment of the present invention.

FIG. 3 shows a second embodiment of the present invention. This embodiment shows a more specific embodiment of the voltage regulation circuit 110 in the first embodiment. As shown in FIG. 3, the voltage regulation circuit 110 includes a high voltage circuit 11 and a voltage regulator 112. The high voltage circuit 111 is electrically connected to the predetermined pin P1 to receive the internal voltage Vint so and provide a converted voltage Vcon. The high voltage circuit 111 can be, for example but not limited to, a metal oxide semiconductor (MOS) device. As shown in FIG. 3, the MOS device is drawn by a thicker line, showing that it is a high voltage device (a transistor device capable of operating under high voltage), different from a low voltage MOS device which operates under a low voltage. The voltage regulator 112 is connected to the high voltage circuit 111, and the voltage regulator 112 generates the operation voltage Vcc according to the converted voltage Vcon. The voltage regulator 112 can include, for example but not limited to, a low dropout regulator (LDO) circuit and a backstop circuit 1121. The backstop circuit 1121 can be, for example but not limited to, a diode D1 as shown in FIG. 3, which can block a current from flowing from the operation voltage Vcc to the high voltage circuit 111. The LDO circuit can include, for example but not limited to, an amplifier A1 and a MOS device Q1 as shown in FIG. 3. The input terminals of the amplifier A1 receive a reference voltage Vref and the operation voltage Vcc, and an output terminal of the amplifier A1 controls a control terminal of the MOS device Q1. The input terminal of the amplifier A1 which is electrically connected to the operation voltage Vcc can be connected to, for example but not limited to, an exterior capacitor C1. The exterior capacitor C1 is electrically connected between the input terminal of the amplifier A1 and a ground voltage level, to regulate the operation voltage Vcc.

Figures 4A, 4B:
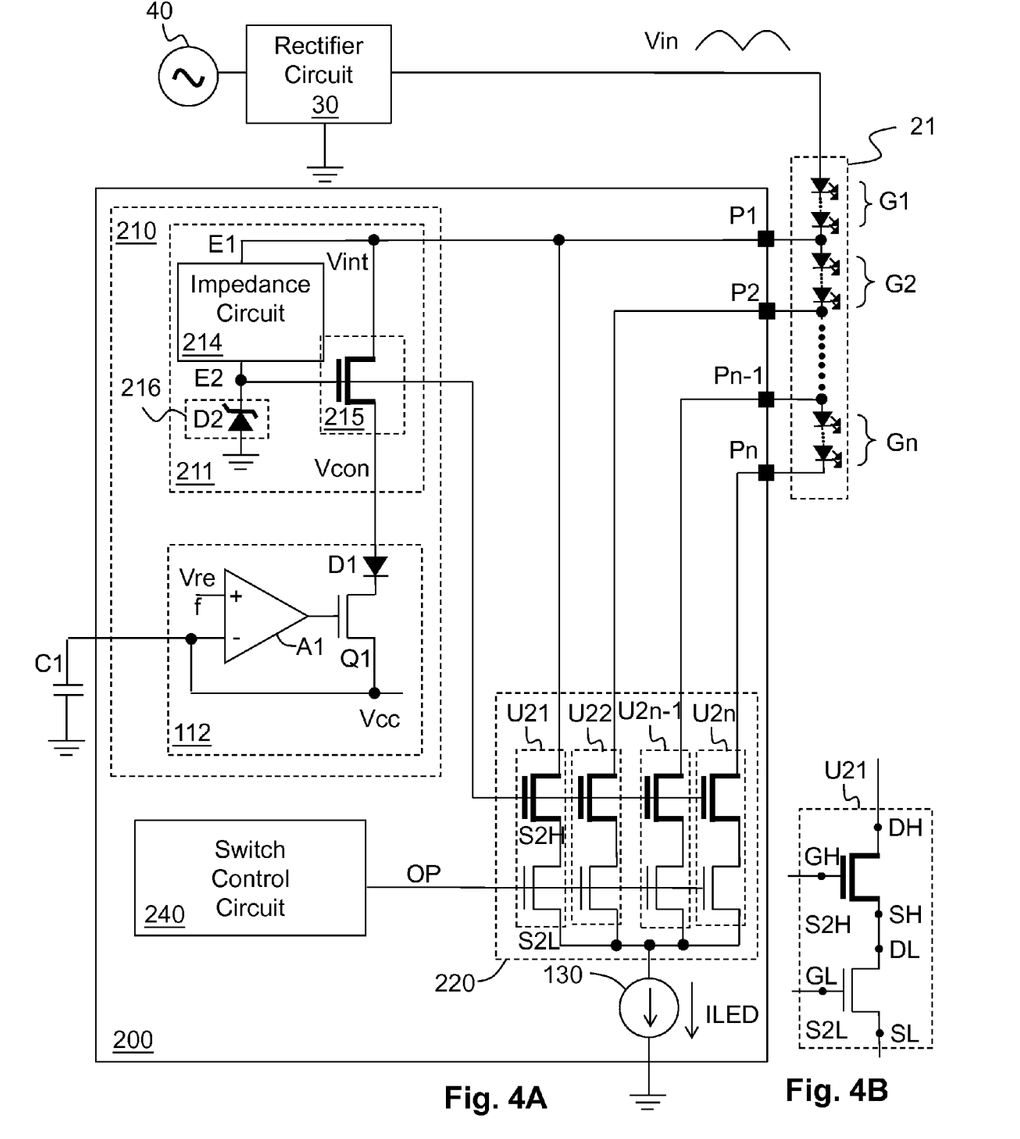
FIGS. 4A-4B show a third embodiment of the present invention.

FIGS. 4A-4B show a third embodiment of the present invention. This embodiment shows another embodiment of the light emitting device driver chip 200 for driving the light emitting device circuit. In this embodiment, the light emitting device circuit for example is an LED circuit 21. The LED circuit 21 includes for example but not limited to plural LEDs connected in series. The plural LEDs are divided into plural LED groups such as a total of n LED groups G1-Gn (as shown in FIG. 4A). A switch circuit 220 includes plural switch groups (e.g., a total of n switch groups U21-U2n as shown in FIG. 4A). The switch groups U21-U2n are electrically connected to the corresponding pins P1-Pn, respectively, and the pins P1-Pn are electrically connected to the corresponding LED groups G1-Gn, respectively. A rectifier circuit 30 rectifies, for example but not limited to, an AC voltage generated from an AC power source 40, to generate a rectified input voltage Vin as shown by the waveform in FIG. 4A. The light emitting device driver chip 200 drives the LED circuit 21 according to the level of the rectified input voltage Vin, to turn ON or OFF the different switch groups U21-U2n, so that one or more of the LED groups G1-Gn of the LED circuit 21 emit light.

The LED circuit 21 receives the rectified input voltage Vin. The light emitting device driver chip 200 includes the pins P1-Pn, a voltage regulation circuit 210, the switch circuit 220, a current source circuit 130 and a switch control circuit 240. The switch circuit 220 includes the aforementioned switch groups U21-U2n which are connected to the corresponding pins P1-Pn, respectively. Taking the switch group U21 as an example, as shown in FIG. 4B, the switch group U21 includes a high voltage switch S2H and a low voltage switch S2L. The high voltage switch S2H has a current inflow terminal DH, a control terminal GH and a current outflow terminal SH. The current inflow terminal DH is electrically connected to the corresponding pin P1. The control terminal GH is electrically connected to the voltage regulation circuit 210, and the control terminal GH determines whether the high voltage switch S2H is turned ON or turned OFF according to the internal voltage Vin. The low voltage switch S2L is electrically connected to the high voltage switch S2H in series. The low voltage switch S2L has a current inflow terminal DL, a control terminal GL and a current outflow terminal SL. The current inflow terminal DL is electrically connected to the current outflow terminal SH. The control terminal GL is electrically connected to the switch control circuit 240, for receiving the operation signal OP. The current outflow terminal SL is electrically connected to the current source circuit 130.

When a voltage drop Vgs between the control terminal GH and the current outflow terminal SH is higher than the threshold voltage Vth of the high voltage switch S2H, the high voltage switch S2H is turned ON. By properly setting a relatively higher voltage drop to fall between the current inflow terminal DH and the current outflow terminal SH of the high voltage switch S2H, the voltage drop between the current inflow terminal DL and the current outflow terminal SL of the low voltage switch S2L is relatively lower, so that the low voltage switch S2L can operate under a low operation voltage. The low voltage switch S2L is the primary control switch, which operates according to the operation signal OP generated from the switch control circuit 240, to determining which LED group is turned ON or turned OFF.

In the third embodiment of the present invention, the voltage regulation circuit 210 includes a high voltage circuit 211 and a voltage regulator 112. The high voltage circuit 211 is electrically connected to the predetermined pin P1 to receive the internal voltage Vint so as to provide the converted voltage Vcon. The voltage regulator 112 is electrically connected to the high voltage circuit 211, and the voltage regulator 112 generates the operation voltage Vcc according to the converted voltage Vcon. The high voltage circuit 211 includes, for example but not limited to, an impedance circuit 214, a high voltage regulation switch 215 and a clamp circuit 216. The impedance circuit 214 can be, for example but not limited to, a resistor. The impedance circuit 214 has a first end E1 and a second end E2. The first end E1 is electrically connected to the predetermined pin P1 to receive the internal voltage Vint. The high voltage regulation switch 215 is electrically connected between the predetermined pin P1 and the voltage regulator 112, and is controlled by the voltage at the second end E2 to convert the internal voltage Vint to the converted voltage Vcon. The clamp circuit 216 can be, for example but not limited to, a Zener diode D2 as shown in FIG. 4A. The clamp circuit 216 is electrically connected between the second end E2 and a ground voltage level, to clamp the voltage level at the second end E2 and to block a current from flowing from the impedance circuit 214 to the ground voltage level.

Figure 5:
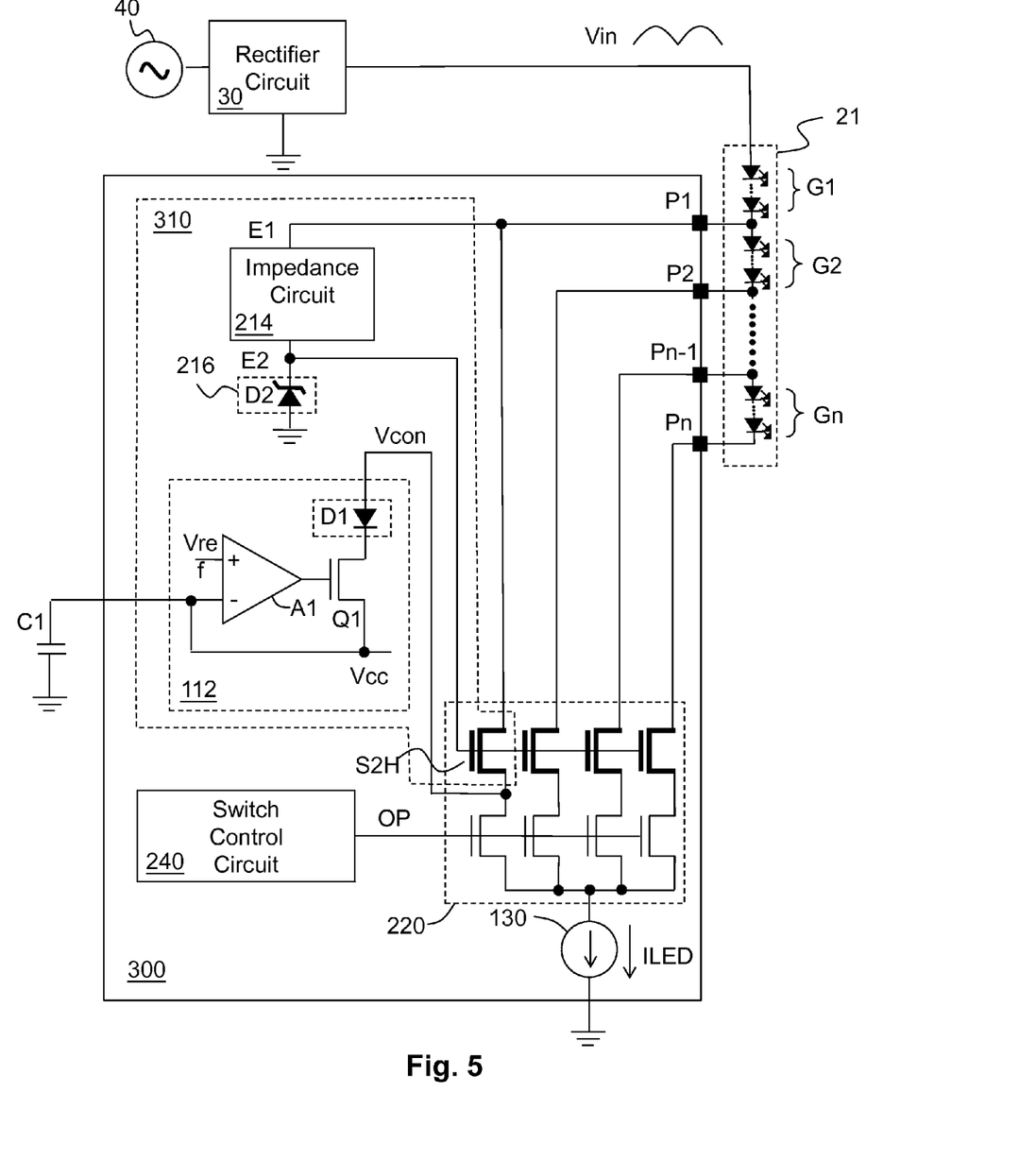
FIG. 5 shows a fourth embodiment of the present invention.

FIG. 5 shows a fourth embodiment of the present invention. This embodiment shows yet another embodiment of the light emitting device driver chip 300. the light emitting device driver chip 300 of this embodiment is substantially the same as the light emitting device driver chip 200 of the third embodiment, but is different in that: the high voltage regulation switch of the voltage regulation circuit 310 and the high voltage switch S2H of the switch circuit 220 are one same switch, which is connected to the predetermined pin P1. A high voltage device, such as the high voltage switch S2H, often occupies a relatively larger area as compared to the other elements or circuits in a chip. The light emitting device driver chip 300 of this embodiment, as compared to the prior art, can save not only the space of a pin but furthermore the space of one high voltage device, to greatly reduce the size of the chip.

Figure 6:
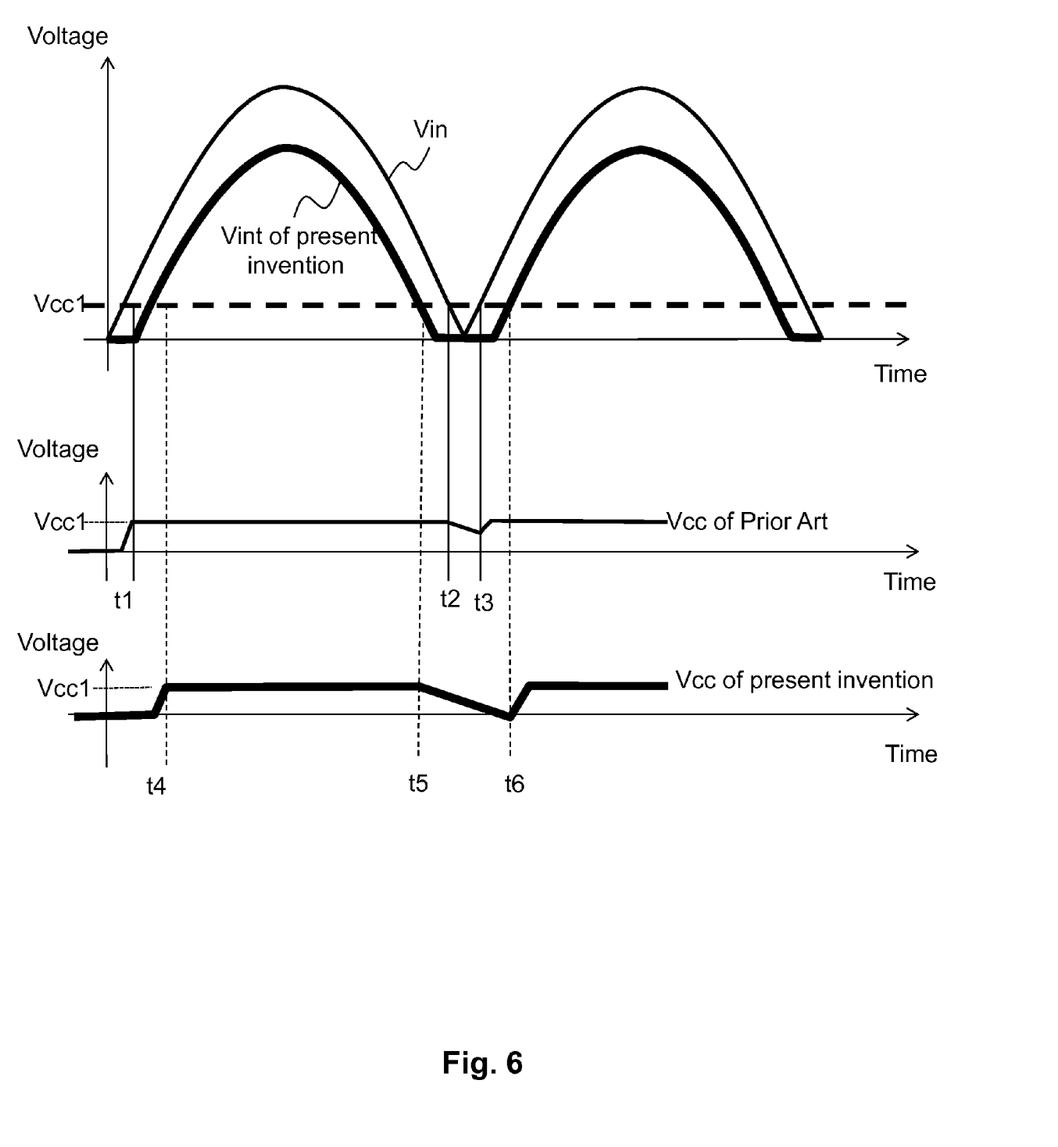
FIG. 6 shows an embodiment of the wave forms of a rectified input voltage Vin, an internal voltage Vint and an operation voltage Vcc.

FIG. 6 shows the waveforms of the rectified input voltage Vin, the internal voltage Vint and the operation voltage Vcc in the present invention and the prior art. As shown in FIG. 6, the rectified input voltage Vin is for example a semi-sinusoidal signal. The internal voltage Vint received by the predetermined pin connected to the light emitting device is slightly lower than the rectified input voltage Vin. In addition, an operation voltage at the level Vcc1 is required as a power source for the operation of the light emitting device driver chip of the present invention and the prior art. In the prior art, during one period, the operation voltage remains at the level Vcc1 from time point t1 to time point t2. In the present invention, however, during one period, the operation voltage is at the level Vcc1 from time point t4 to time point t5. That is, the time period in which the rectified input voltage Vin is lower than the level Vcc1 is from time point t2 to time point t3, which is relatively shorter, but in the present invention, the time period in which the internal voltage Vint is lower than the level Vcc1 is from time point t5 to time point t6, which is relatively longer. To solve this problem, in the third embodiment and the fourth embodiment, the capacitance of the exterior capacitor C1 can be increased. For example, the capacitance of the exterior capacitor C1 can be set three times of the exterior capacitor C1 of the prior art wherein the rectified input voltage Vin is directly received. For example, the capacitance of the exterior capacitor C1 can be set higher than 2 uF.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, a device which does not substantially influence the primary function of a signal can be inserted between any two devices or circuits shown to be directly connected in the embodiments, such as a switch. For another example, the light emitting device is not limited to the LED in the shown embodiments, but can be any light emitting device having a forward end and a reverse end. For still another example, the PMOS device can be replaced with an NMOS device, and the NMOS device can be replaced with a PMOS device, with corresponding amendments of the circuits processing these signals. For still another example, an LED group is not limited to including two LEDs as shown in the embodiments; it can include any number of LEDs. In view of the foregoing, the spirit of the present invention should cover all such and other modifications and variations, which should be interpreted to fall within the scope of the following claims and their equivalents.

What is claimed is:

1. A light emitting device driver chip for driving a light emitting device circuit, wherein the light emitting device circuit includes a plurality of light emitting devices connected in series and the light emitting device circuit is for receiving a rectified input voltage, the plurality of light emitting devices including a top light emitting device having an anode directly connected to the rectified input voltage, the light emitting device driver chip comprising:

a plurality of pins, each of which is electrically connected to a corresponding one or ones of the light emitting devices, respectively, wherein an internal voltage is provided through a predetermined one (predetermined pin) of the pins;

a voltage regulation circuit electrically connected to the predetermined pin, for receiving the internal voltage so as to provide an operation voltage, wherein the operation voltage is a power source required for an operation of an internal circuit of the light emitting device driver chip;

a switch circuit including a plurality of switch groups, wherein each of the switch groups is electrically connected to a corresponding one of the pins, respectively;

a current source circuit electrically connected to the switch circuit, for providing a light emitting device current to at least one light emitting device which is turned ON; and a switch control circuit electrically connected to the switch circuit, for generating an operation signal to control at least one of the switch groups of the switch circuit, so as to determined which light emitting device is turned ON;

wherein the predetermined pin is indirectly connected to the rectified input voltage through at least one of the plurality of light emitting devices between the predetermined pin and the rectified input voltage, whereby the plurality of pins do not include a pin which is connected through the anode of the top light emitting device to the cathode of the top light emitting device.

2. The light emitting device driver chip of claim 1, wherein the voltage regulation circuit includes:

a high voltage circuit electrically connected to the predetermined pin, for receiving the internal voltage so as to provide a converted voltage; and a voltage regulator electrically connected to the high voltage circuit, for generating the operation voltage according to the converted voltage.

3. The light emitting device driver chip of claim 2, wherein the high voltage circuit includes:

an impedance circuit having a first end and a second end, wherein the first end is electrically connected to the predetermined pin to receive the internal voltage;

a high voltage regulation switch electrically connected between the predetermined pin and the voltage regulator, and is controlled by a voltage at the second end to convert the internal voltage into the converted voltage; and a clamp circuit electrically connected between the second end and a ground voltage level, for clamping a voltage level at the second end and for blocking a current from flowing from the impedance circuit to the ground voltage level.

4. The light emitting device driver chip of claim 1, wherein each of the switch groups includes:

a high voltage switch including:
  a first current inflow terminal electrically connected to the corresponding one of the pins;
  a first control terminal electrically connected to the voltage regulation circuit, for determining whether the high voltage switch is turned ON or turned OFF according to the internal voltage; and
  a first current outflow terminal; and a low voltage switch electrically connected to the high voltage switch in series, wherein the low voltage switch includes:
  a second current inflow terminal electrically connected to the first current outflow terminal;

a second control terminal electrically connected to the switch control circuit, for receiving the operation signal; and a second current outflow terminal electrically connected to the current source circuit.

5. The light emitting device driver chip of claim 2, wherein the voltage regulator includes a low dropout regulator (LDO) circuit.

6. The light emitting device driver chip of claim 2, wherein the voltage regulator is electrically connected to an exterior capacitor and the exterior capacitor is electrically connected between the voltage regulator and a ground voltage level, for regulating the operation voltage.

7. The light emitting device driver chip of claim 2, wherein one of the switch groups includes:

a high voltage switch electrically connected to the predetermined pin, wherein whether the high voltage switch is turned ON or turned OFF is determined according to the internal voltage; and a low voltage switch electrically connected to the high voltage switch in series, wherein the low voltage switch is electrically connected to the switch control circuit for receiving the operation signal which determines which one or ones of the light emitting devices are turned ON;

wherein the high voltage circuit and the switch group includes the same high voltage switch which is electrically connected to the predetermined pin.

\* \* \* \* \*